United States Patent
Van Den Eijnde et al.

(10) Patent No.: US 12,528,716 B2
(45) Date of Patent: Jan. 20, 2026

(54) SYSTEM FOR REMOVING AMMONIA FROM AN AMMONIA-CONTAINING EFFLUENT, AND METHOD FOR THE SAME

(71) Applicant: NIJHUIS WATER TECHNOLOGY B.V., Doetinchem (NL)

(72) Inventors: Tuur Bert Theo Van Den Eijnde, Nijmegen (NL); Gerrit Oopke Jan Smith, Brummen (NL); Hendrik Willem Herman Menkveld, Vorden (NL)

(73) Assignee: NIJHUIS WATER TECHNOLOGY B.V., Doetinchem (NL)

( * ) Notice: Subject to any disclaimer, the term of this patent is extended or adjusted under 35 U.S.C. 154(b) by 363 days.

(21) Appl. No.: 18/264,589

(22) PCT Filed: Feb. 10, 2022

(86) PCT No.: PCT/NL2022/050067
§ 371 (c)(1),
(2) Date: Aug. 8, 2023

(87) PCT Pub. No.: WO2022/173297
PCT Pub. Date: Aug. 18, 2022

(65) Prior Publication Data
US 2024/0132376 A1    Apr. 25, 2024

(30) Foreign Application Priority Data
Feb. 10, 2021   (NL) .................................. 2027533

(51) Int. Cl.
*C02F 1/04* (2023.01)
*C02F 1/469* (2023.01)
*C02F 101/16* (2006.01)

(52) U.S. Cl.
CPC .............. *C02F 1/04* (2013.01); *C02F 1/4693* (2013.01); *C02F 2101/16* (2013.01)

(58) Field of Classification Search
CPC ...... C02F 1/04; C02F 1/4693; C02F 2101/16; C02F 2301/08; C02F 2303/18; C02F 1/20; B01D 19/0015; C01C 1/28; C01C 1/10
USPC ........................................................ 210/638
See application file for complete search history.

(56) References Cited

U.S. PATENT DOCUMENTS

| | | | |
|---|---|---|---|
| 4,668,250 A | 5/1987 | Drese | |
| 2014/0284214 A1 | 9/2014 | Meessen et al. | |

FOREIGN PATENT DOCUMENTS

| | | | |
|---|---|---|---|
| EP | 2239030 A1 | 10/2010 | |
| WO | WO 2014/065527 A1 | 5/2014 | |

*Primary Examiner* — Ekandra S. Miller-Cruz
(74) *Attorney, Agent, or Firm* — Ipsilon USA—NLO

(57) ABSTRACT

A system for removing ammonia from an ammonia-containing liquid, comprising a heat exchanger, an ammonia stripper and an acid scrubber, wherein the ammonia stripper comprises at least two stripper units, which are in fluid communication with one another through a series connection, forming a fluid flow path from the ammonia-containing liquid inlet through the at least two stripper units to the liquid discharge outlet, and wherein the acid scrubber comprising at least two scrubber units, which are in gas communication with one another and the at least two stripper units through a series connection, forming a gas flow path from the air inlet through the at least two stripper units and scrubber units to the scrubber air outlet which is opposite to the fluid flow path through the striper units.

14 Claims, 3 Drawing Sheets

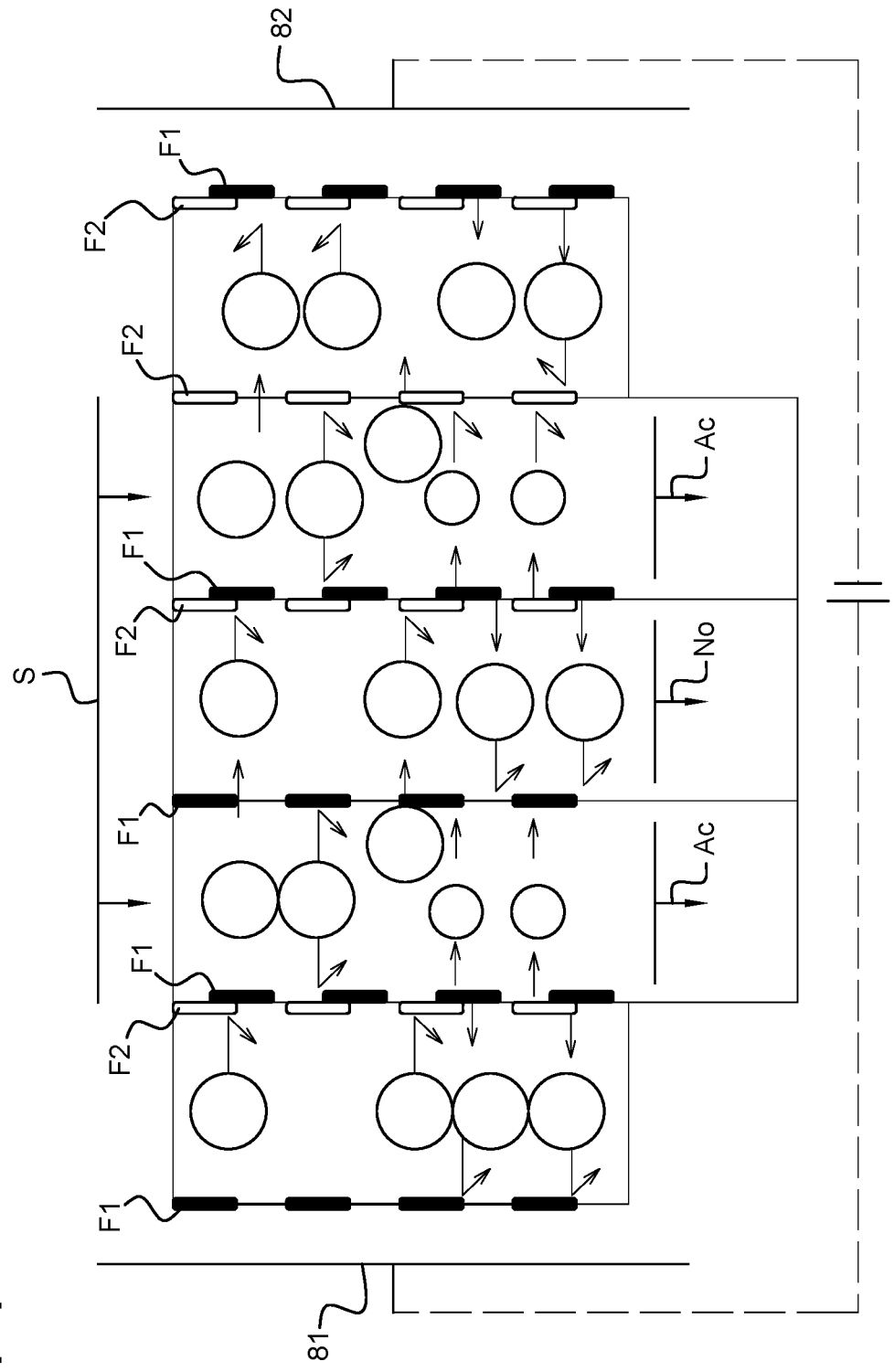

SYSTEM FOR REMOVING AMMONIA FROM AN AMMONIA-CONTAINING EFFLUENT, AND METHOD FOR THE SAME

FIELD OF THE INVENTION

The present invention relates to a system for removing ammonia from an ammonia-containing effluent, which system comprises: a heat exchanger for heating the ammonia-containing liquid to a predetermined temperature; an ammonia stripper for stripping ammonia from the ammonia-containing liquid from the heat exchanger and discharging it as ammonia-containing gas, the ammonia stripper comprising an ammonia-containing liquid inlet, an air inlet, an ammonia-containing gas outlet, and a liquid discharge outlet; and an acid scrubber for reacting the ammonia in the ammonia-containing gas discharged from the ammonia stripper with acid to form an ammonium salt, the acid scrubber comprising an ammonia-containing gas inlet, an acid inlet, a salt removal outlet and a scrubbed air outlet.

Further, the invention relates to a method for removing ammonia from an ammonia-containing effluent.

BACKGROUND ART

Ammonia is common in nature and widely used industrially, such as for cleaning, employment as a refrigerant in cooling systems or in fertilizers to provide the nitrogen source required to increase crop yields. However, large concentrations of ammonia can damage human health and ecosystems. One of the primary naturally occurring sources of ammonia on earth is the decay of organic matter. It also forms as part of the excretion cycle of humans and animals, as the kidneys secrete ammonia to neutralize excess acid. There are various types of effluent containing high concentrations of ammonia and toxic compounds, such as that derived from secondary effluent of municipal wastewater treatment plant, animal manure, and landfill leachate. Consequently, ammonia is a commonly encountered water pollutant, which needs to be removed in order to prevent build up to unsafe concentrations in both water and land and to provide drinking water safe for consumption.

A preferred method of cleaning effluent from ammonia is to employ an ammonia stripping method as it is a fairly stable process which allows the ammonia being recovered from the stripping process for re-use. Two principal methods of stripping ammonia from liquid are known, wherein the ammonia is removed as a gas. The first method is a chemical process that involves increasing the pH of the liquid, and the second is a thermal method that uses heat only. Both methods break the ionic bond that holds ammonia as $NH_4^+$ and convert the ammonia to $NH_3$, the free, gaseous, form.

Increasing the pH usually involves the adding of a caustic agent such as lime or caustic soda.

A system for carrying out such a thermal stripping method is known from WO 2020/039160 A1. The described system comprises: a primary heat exchanger for heating the ammonia containing liquid to operational temperature; an ammonia stripper for stripping ammonia from the ammonia-containing liquid from the primary heat exchanger and discharging it as ammonia-containing gas, the ammonia stripper comprising an ammonia-containing liquid inlet, a hot air inlet, an ammonia-containing gas outlet, and a liquid discharge outlet; and an acid scrubber for reacting the ammonia in the ammonia-containing gas discharged from the ammonia stripper with acid to form an ammonium salt, the acid scrubber comprising an ammonia-containing gas inlet, an acid inlet, a salt removal outlet and a scrubbed air outlet; wherein the scrubbed air outlet is in fluid communication with the hot air inlet of the ammonia stripper, such that scrubbed air which is discharged from the acid scrubber may be recycled for use in the ammonia stripper.

A downside to the known systems for removing ammonia from waste water is that they use a significant amount of energy for heating and/or chemicals to produce clean water and air, making them rather expensive and environmentally unfriendly to run.

It is an aim of the invention to provide an improved system and method for removing ammonia from ammonia-containing effluent, which is more environmentally friendly and economical to run.

SUMMARY OF THE INVENTION

According to a first aspect of the present invention, a system as defined above is provided, in which the ammonia stripper comprises at least two stripper units, which are in fluid communication with one another through a series connection, wherein, in each pair of adjacent stripper units, a liquid outlet of a first one of the pair of adjacent stripper units is connected to a liquid inlet of a second one of the pair of adjacent stripper units, and wherein a first of the at least two stripper units is with a liquid inlet connected to the ammonia-containing liquid inlet and a last of the at least two stripper units is with a liquid outlet connected to the liquid discharge outlet, forming a fluid flow path from the ammonia-containing liquid inlet through the at least two stripper units to the liquid discharge outlet; and the acid scrubber comprising at least two scrubber units, which are in gas communication with one another and the at least two stripper units through a series connection, wherein, in each pair of adjacent scrubber units, an individual ammonia-containing gas inlet of each one of the adjacent scrubber units is connected to an individual ammonia-containing gas outlet of a respective ammonia stripper of a pair of adjacent stripper units, and a gas outlet of a second one of the adjacent scrubber units is connected to a gas inlet of the first one of the pair of adjacent stripper units, and wherein a gas inlet of the last of the at least two stripper units is connected to the air inlet and a first of the at least two scrubber units is connected to the scrubber air outlet, forming a gas flow path from the air inlet through the at least two stripper units and scrubber units to the scrubber air outlet which is opposite to the fluid flow path through the striper units.

The ammonia stripping process is based on the principle of mass transfer. It is a process, by which water is contacted with air to strip the ammonia gas present in the effluent. Ammonia nitrogen in water exists in equilibrium between the molecular ($NH_3$) and ionic form ($NH_4^+$) according to the following reaction: $NH_3 + H_2O \rightleftharpoons NH_4^+ + OH^-$, wherein the molecular ammonia is a gas. The ammonia stripping is influenced by temperature, pH, and air to water ratio. The relative concentrations of ammonia gas and ammonium ions are subjected to the pH and the temperature of effluent. The formation of ammonia gas is favored by increasing the pH, which shifts the chemical equilibrium to the right, thus inducing the formation of ammonia gas. Furthermore, the solubility of ammonia in water is governed by Henry's law, in which the constant of gas relies on solute, solvent, and temperature, such that temperature has a significant impact on the formation of ammonia gas. As a result, ammonia removal from water is more efficient at higher temperatures and/or increased pH. Finally, mass transfer of ammonia into the air is affected by the variance between ammonia concentration level in liquid form and air phase, causing the air to water ratio having an impact on the removal rates of ammonia in water.

The incoming effluent is normally slightly acidic due to the presence of dissolved carbon dioxide. Dissolved carbon dioxide exists in equilibrium according to the following reaction: $CO_2+H_2O \rightleftharpoons H_2CO_3$, wherein the carbon dioxide ($CO_2$) is a gas. This gas is removed together with the ammonium in the stripper. Thus by operating at least two stripper units in a series connection, a new equilibrium is obtained in each subsequent stripper unit, a fraction of effluent therein containing less dissolved carbon dioxide and therefore a higher pH.

Through the use of at least two stripper and scrubber units, the effluent is cleaned in multiple stages, thereby obtaining cleaner water. By having the last stripper unit connected to the air inlet, and running the stripper and scrubber units with their gas flow counter-current to the liquid current through the stripper units, the cleanest air is contacted with the cleanest water (effluent fraction) with the highest pH, further increasing the efficiency with which ammonia is removed. Consequentially, less air is required for stripping of the liquid. Due to the use of less air to strip out ammonia (due to the higher efficiency), less evaporation takes place within the system, causing less heat loss being experienced throughout the cleaning process therewith. Thus by operating the stripper and scrubber with multiple stripper units and scrubber units which are connected counter-current, more extensive removal of ammonia is achieved without using extremely high gas/liquid rations, extremely high temperatures (>80° C.) or adding chemicals to increase the pH. Furthermore, the net heat consumption from external heat sources is relatively small compared to known systems due to the lower heat loss throughout the cleaning process. Thus the system according to the invention requires less energy and/or use of chemicals than known systems for removing ammonia from ammonia-containing liquid, making the system more economical and environmentally friendly to run. Normally, the incoming effluent has a temperature of around 35° C., which, prior to entering the system is heated up, to a temperature between 60° C. and 80° C., preferably to a temperature less than 70° C., without requiring additional heat being added in the stripper and/or scrubber units for optimum ammonia removal.

A further advantage to this system is that the use of at least two stripper and scrubber units, which operate separately from each other results in a more robust and reliable system. Failure of a control/pumps of one of the stripper and scrubber units, which are connected via their respective ammonia-containing gas outlet and inlet, reduces the efficiency of the total system, but not the complete loss of the process.

In an embodiment, each scrubber unit comprises an individual acid inlet and an individual salt removal outlet. The system is arranged to run each of the scrubber units at specific favorable conditions for scrubbing the ammonium-containing gas received therein in order to optimize the washing efficiency at the different concentrations of ammonia in each of the scrubber units. Through the individual acid inlets, the amount of acid let into each one of the scrubber units is adjusted to achieve a specific favorable pH therein for cleaning the ammonium-containing gas such that clean air is let out from each of said scrubber units. The acid may be any suitable acid, for example sulphuric acid, nitric acid, phosphoric acid, an organic acid or a buffer solution, such as for example a phosphate buffer. Said acid forms a corresponding salt, i.e. ammonium sulphate, ammonium nitrate, ammonium phosphate, etc respectively, in a respective scrubber unit, which is removed via the individual salt removal outlet thereof. Hereto, the system may further comprise a control system which is adapted to regulate an amount of acid into each one of the at least two scrubber units based on a concentration of ammonia in each respective one of the at least two scrubber units.

In another embodiment, the system further comprises a bipolar membrane electrodialysis element, adapted for splitting ammonium salt into ammoniumhydroxide and acid, which bipolar membrane electrodialysis element comprises an inlet, which is connected to the salt removal outlet, an ammonium hydroxide outlet and an acid outlet, which is connected to the acid inlet of the acid scrubber, such that acid used in the acid scrubber for forming ammonium salt is recovered and recycled for use in the acid scrubber. The bipolar membrane electrodialysis element (EDBM) located between the salt removal outlet and the acid inlet thus recovers the acid for re-use, thus significantly reducing the amount of acid required to clean the air used in the stripper. Through the recycling of the acid, little to no acid needs to be added to the system, once in use, thereby making the system even more economically and environmentally attractive.

Preferably, the inlet of the EDBM is connected with the salt removal outlet via a salt buffertank and the acid outlet of the EDBM is connected with the acid inlet of the acid scrubber via an acid buffertank. The salt and acid buffertanks allow the EDBM being operated at a rate substantially independent from the rate at which the stripper and scrubber are operated, such that its operational rate can be kept optimal. The salt buffertank comprises a pump for supplying the salt to the EDBM at the optimal rate for recycling. The acid buffertank comprises a pump for supplying acid to the scrubber units at a rate required by each of the scrubber units. Thus the pumps of the buffertanks are individually operable.

In an embodiment, the liquid discharge outlet is connected to the heat exchanger, such that heat from the discharged liquid is recycled to heat up the ammonia-containing liquid prior to entering the ammonia stripper. The heat put into the system to heat up the incoming effluent is re-used by running the discharged liquid, which should be clean water (also called influent), from the liquid discharge outlet through the heat exchanger, to heat up the incoming effluent. Due to the stripper and scrubber units being with their gas inlets and outlets connected in series, a relatively low amount of air is used for the air stripping compared to conventional air strippers of a similar capacity. As a result, less evaporation takes place in each of the air stripping units during stripping out of ammonia, causing only little heat loss of the liquid passing through the series of stripper units. This heat loss is less than in conventional air strippers of the same cleaning capacity. Due to this relatively low heat loss, the discharge liquid has a temperature relatively close to the temperature of the effluent leaving the heat exchanger, such that the recycling of this heat results in the system having a net heat consumption from the external heat source to be smaller than from known systems.

Preferably the heat exchanger is formed by two or three heat exchanging units, wherein one of the heat exchanging units receives the residual heat from the liquid discharge outlet and wherein one of a second and/or third heat exchanging unit are connected receive residual heat from one of the scrubbed air outlet and a processing system preceding the claimed system, from which the incoming effluent is discharged.

In another embodiment, the system comprises a further heat exchanger positioned at the air inlet of the ammonia stripper, to control the temperature of the scrubbed air entering the ammonia stripper. The air may be heated prior to entering the ammonia stripper, preventing the effluent being treated inside the ammonia stripper from cooling down too much. Hereto, the air is heated to a temperature which is close to the temperature of the effluent. Preferably a temperature between 50° C. and 70° C., most preferred to a temperature of around 60° C. Advantageously, the heated air may contain a higher water vapour content, which reduces evaporation when used in the ammonia stripper. In order to further conserve energy, the further heat exchanger may be positioned within the flow path of the scrubbed air leaving the acid scrubber between the scrubbed air outlet of the acid scrubber and air inlet of the ammonia stripper, using the heat of the scrubbed air to heat up the incoming air.

In an embodiment, each of the at least two stripper units comprises a column which is with an upper end connected to a respective one of the at least two scrubber units via the individual ammonia-containing gas outlet, with each column being located in a sump. Each sump may be provided with an individual recirculation pump. Due to the columns being interconnected in this particular series connection, each of the stripper and scrubber units required to jointly clean the effluent is smaller than current commonly used stripper-scrubber columns providing the same amount of cleaning. As a result, much smaller and lower capacity pumps are required for providing the recirculation. Furthermore, the stripper and scrubber units for the system being smaller than stripper-scrubber columns for known systems, which systems are rated for providing the same amount of cleaning, make the stripper and scrubber units easier to install and maintain and may result in less floor-space being required.

In an embodiment, one or more of the air inlet, ammonia gas outlet, ammonia gas outlet and scrubbed air outlet is provided with a fan. The one or more fans provide the airflow through the system, which airflow is relatively small compared to blowers, such as currently commonly used in stripper-scrubber systems. Due to the use of at least two stripper units and at least two scrubber units, connected in series as described, the individual units are much smaller than in current commonly used stripper-scrubber columns, such that the amount of air required from the air inlet for reacting with the effluent is lower. Fans are cheaper than blowers and require less energy, such that their inclusion in the system results in the system being cheaper to build and operate.

According to a second aspect of the invention, a method of removing ammonia from an ammonia-containing liquid is provided. The method comprises the steps of:—
  heating the ammonia-containing liquid
  stripping ammonia from the ammonia-containing liquid in an ammonia stripper using air, and discharging the ammonia as ammonia-containing gas and the liquid as effluent; and
  passing the ammonia-containing gas into an acid scrubber and reacting the ammonia in the ammonia-containing gas with acid to form an ammonium salt, and discharging scrubbed air;
  wherein the step of stripping the ammonia from the ammonia-containing liquid comprises passing the ammonia-containing liquid through a series of at least two stripper units, and using fresh air only in a last one of the at least two stripper units, and wherein the step of passing the ammonia-containing gas into an acid scrubber comprises passing the ammonia-containing gas from each of the at least two stripper units to a respective one of at least two scrubber units, and using scrubbed air from the scrubber unit to strip ammonia from the ammonia-containing liquid in an ammonia stripper unit which is preceding to the ammonia stripper unit from which ammonia-containing gas is passed into the scrubber unit.

By passing the ammonia-containing liquid through at least two stripper units, the effluent is cleaned in multiple stages, thereby obtaining cleaner water. Through the gas flow through the stripper and scrubber units being counter-current to the liquid current through the stripper units, the cleanest air is contacted with the cleanest water (effluent fraction) with the highest pH, further increasing the efficiency with which ammonia is removed. Consequentially, less air is required for stripping of the liquid, which lower amount of air consequently results in less evaporation and heat loss in the stripper units. As a result, less heat needs to be put into the liquid, and possibly air, in order to remove the ammonia from the liquid, making the method more economical and environmentally friendly that known cleaning methods.

In an embodiment, the method further comprising the steps of:
  passing the ammonium salt through a bipolar membrane electrodialysis element which splits the ammonium salt into ammoniumhydroxide and acid; and
  recycling the acid to the acid scrubber for use in the scrubber units.

Through the recycling of the acid, little to no additional acid needs to be added when continuously cleaning using the method, thereby making the method even more economically and environmentally attractive.

In an embodiment, the method further comprises the step of passing the effluent through a heat exchanger prior to discharge and using heat from the heat exchanger for heating the ammonia-containing liquid. The heat of the effluent being discharged is residual heat, which is used to heat up the ammonia-containing liquid prior to starting the cleaning. This reduces the amount of additional heat required being added from an external source in order to get the temperature of the ammonia-containing liquid to a predetermined temperature optimal for reacting the ammonia with the air.

In an embodiment, the method further comprises the step of heating the fresh air used in the last one of the at least two stripper units prior to supplying the air to the last one of the at least two stripper units. By heating the fresh air prior to contacting the liquid, thermal loss during cleaning of the liquid is limited.

In an embodiment, the method further comprises passing scrubbed air discharged from the scrubber unit connected to the first one of the stripper units through a heat exchanger and using the heat for heating the fresh air used in the last one of the at least two stripper units. Thus residual heat from the stripper unit is used to heat the incoming fresh air, rather than using heat from an external source. This reduces the amount of additional energy that needs to be added in order to perform the cleaning method. Additionally or alternatively, the method may further comprise passing scrubbed air discharged from the scrubber unit connected to the first one of the stripper units through a heat exchanger and using the heat for heating the ammonia-containing liquid.

In an embodiment, the method according to the second aspect of the invention is performed using a system according to the first aspect of the invention.

BRIEF DESCRIPTION OF THE DRAWINGS

Embodiments of a system for removing ammonia from an ammonia-containing effluent according to the present invention will be described by way of example, with reference to the attached drawings, in which:

FIG. 4 shows a schematic of a bipolar membrane electrodialysis element for use in a system such as depicted in FIG. 1 or FIG. 3.

DESCRIPTION OF EMBODIMENTS

Figure 1:
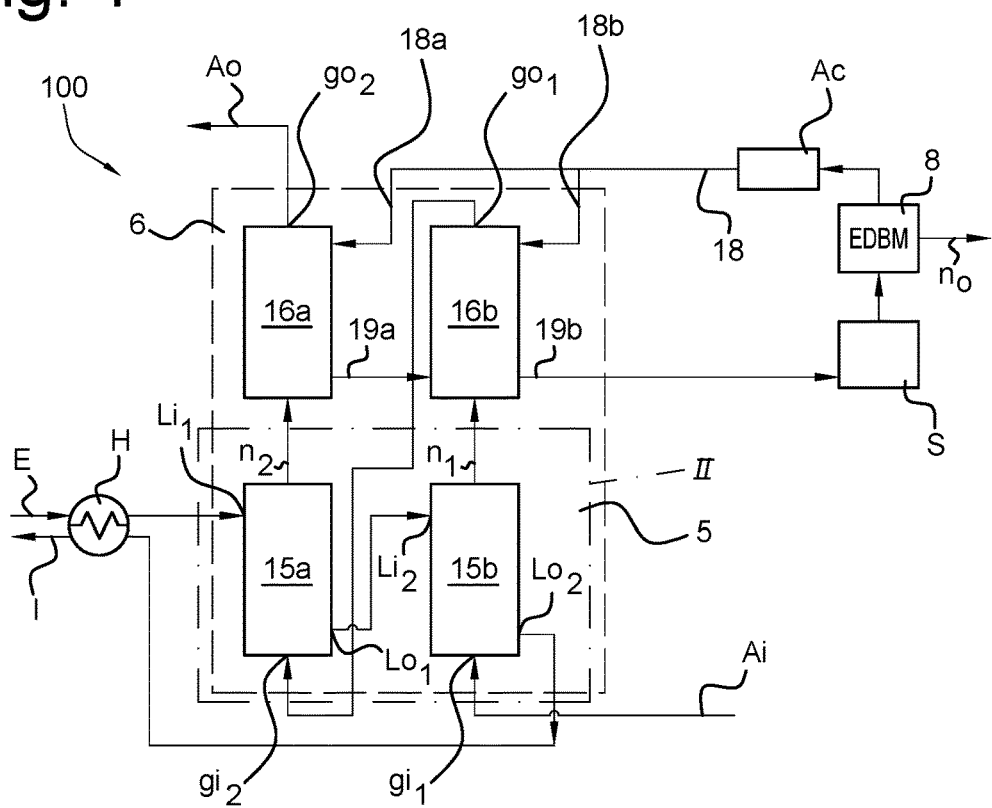
FIG. 1 shows a schematic of a system according to the present invention.

FIG. 1 shows a schematic of a system 100 according to the invention, the system 100 having a heat exchanger H, a stripper-scrubber set 6 with an air stripper 5 and an acid scrubber, an acid inlet 18 connected to an acid buffertank Ac, a salt removal outlet 19 connected to a salt buffertank S and a bipolar membrane electrodialysis element (EDBM) 8.

An effluent inlet E is guided via the heat exchanger H, which is adapted to heat ammonia-containing liquid to a predetermined temperature, to a liquid inlet of the air stripper 5. The heat exchanger H is formed by a set of heat exchanging units. Said air stripper 5 is adapted for stripping ammonia from the ammonia-containing liquid and discharge the cleaned liquid, which is water, via a liquid discharge outlet I that is passed through one of the heat exchanging units of the heat exchanger H for passing heat from the discharged liquid to the incoming ammonia-containing liquid. Further, the air stripper is provided with an air inlet Ai for providing the required air for the stripping of the ammonia from the ammonia-containing liquid, and an ammonium-containing gas outlet for discharging gas resulting from contacting the ammonium-containing liquid with the air. The ammonium-containing gas outlet is connected to an ammonium-containing gas inlet of the acid scrubber, which is adapted to clean the ammonium-containing gas, using an acid or a buffer liquid and discharge scrubbed air via an outlet of the acid scrubber. To obtain the required acid or buffer liquid, the acid scrubber is provided with the acid inlet 18 on a first side, and provided with the salt removal outlet 19b on a second side, for removing ammonium salt resulting from the ammonium-containing gas with the acid or buffer liquid. The EDBM 8 is with an inlet connected to the salt buffertank S and with an outlet to the acid buffertank Ac, and adapted for splitting the ammonium salt in the salt buffertank S back into the acid from the acid buffertank Ac and ammoniumhydroxide. The EDBM 8 is provided with an ammonia-outlet No for discharge of said ammoniumhydroxide.

The air stripper 5 consists of two stripper units 15a, 15b, which are each provided with a liquid inlet Li1, Li2, for receiving ammonia-containing liquid, and a liquid outlet Lo1, Lo2, for discharging cleaned liquid, which is a fraction of the ammonia-containing liquid let into a respective one of the stripper units 15a, 15b. Additionally, each stripper unit 15a, 15b is provided with a gas inlet Gi1, Gi2 for receiving air and a gas outlet N1, N2 for discharging ammonia-containing gas. The gas inlets Gi1, Gi2 and liquid outlets Lo1, Lo2 are preferably each provided in a lower end of the stripper units 15a, 15b and the gas outlets N1, N2 and liquid inlets Li1, Li2 each in an upper end of the stripper units 15a, 15b. As a result, the liquid flow and the gas flow inside each stripper unit 15a, 15b is counter-current, ensuring maximum contact between both, whilst gravity reduces pumping capacity required due to the liquid naturally flowing downwards and gas bubbling upwards towards their respective outlets. The two stripper units 15a, 15b are in fluid communication with each other through a series connection, wherein the liquid outlet Lo1 of the first stripper unit 15a is connected to the liquid inlet Li2 of the second stripper unit 15b (see FIG. 2 for details). The liquid inlet Li1 of the first stripper unit 15a is connected to the effluent inlet E, while the liquid outlet Lo2 of the second stripper unit 15b is connected to the liquid discharge outlet I for expelling influent or cleaned water from the system.

The acid scrubber also consists of two scrubber units 16a, 16b. Each of the acid scrubbers 16a, 16b is provided with a gas inlet, for receiving ammonia-containing gas, and a gas outlet Go1, Go2 for discharging scrubbed air. Additionally, each scrubber unit 16a, 16b is provided with an acid inlet 18a, 18b and a salt removal outlet 19a, 19b. The gas inlets are provided in a lower end of each of the scrubber units 16a, 16b and connected to a respective gas outlet N1, N2 of one of the stripper units 15a, 15b, such that two stripper-scrubber columns 10 are formed. The acid inlets 18a, 18b are provided in an upper end of each of the scrubber units 16a, 16b, with the gas and acid passing counter-currently to each other within each scrubber unit 16a, 16b. The reaction of the acid with the ammonia forms an ammonium salt which collects in the bottom of each scrubber unit 16a, 16b under gravity and is removed through one of the respective salt removal outlets 19a, 19b. The salt removal outlet 19a of the first scrubber unit 16a is connected to the second scrubber unit 16b, for leading the ammonium salt, together with left-over acid, to the second scrubber unit 16b, where the left-over acid from the preceding scrubber unit reacts with the ammonia-containing gas entering via the gas outlet N2 of the second stripper unit 15b. The ammonium salt collected in the second scrubber unit 16b, this being the last scrubber unit in the series, is removed via the salt removal outlet 19b thereof and lead to the salt buffertank. In case additional acid is required for reacting all ammonia-containing gas to forming ammonium salt, additional acid may be added to the second scrubber via the acid inlet 18b thereof, which is independently operable from the other acid inlet 18a. Alternatively, the system may be operated such that all required acid for the reactions in the series of scrubber units 16a, 16b is added to the first scrubber unit thereof, such that the subsequent scrubber unit may not be provided with an acid inlet.

To provide the counter-current flow of air through the system and efficiently use the heat added to the system, the air inlet Ai provided to the air stripper 5 is connected to the gas inlet Gi1 of the last of the two stripper units 15b and the gas outlet Go1 of the last one of the two scrubber units 16b is connected to the gas inlet Gi1 of the first one of the two stripper units 15a. The gas outlet Go1 of the first one of the two scrubber units 16a discharges scrubbed air from the system 100 via a scrubbed air outlet Ao. The reaction between the acid and the ammonia is exothermic, such that the scrubbed air leaving a scrubber unit 16a, 16b has a similar temperature to the ammonia-containing gas being discharged by a respective stripper unit 15a, 15b, without the acid having to be heated prior to introduction in a respective scrubber unit 16a, 16b. Through the re-use of the scrubbed air from a scrubber unit 16b in a preceding stripper unit 15a, the heat generated in the exothermic reaction is used to reduce the temperature loss of the liquid in the stripper 15a due to the removal of the ammonia-containing gas, compensating for any heat loss during stripping and/or lowering the amount of heat required to be put in by the heat exchanger H when the effluent enters the system 100.

Through the liquid flow and the gas flow inside the stripper-scrubber set 6 being counter-current and the use of multiple stripper units and scrubber units, step-wise cleaning of both the liquid and the gas takes place at a lower cost of both energy and chemical input. The effluent lead into the first one of the stripper units 15a has a first total amount of ammonium and a first total amount of dissolved carbon dioxide present, both in an equilibrium state depending on a thermal state of the effluent. The air flowing through the liquid inside the first stripper unit 15a gains the molecular ammonium and carbon dioxide, which are together discharged from the first stripper unit 15a to the first scrubber unit 16a via the first gas outlet N1. The remaining fraction of effluent is discharged via the liquid outlet Lot and lead into the second stripper unit 15b, said fraction having a higher pH due to a lower amount of dissolved carbon dioxide being present, resulting in a larger amount of molecular ammonium becoming available under the new ammonia equilibrium naturally developing in this fraction of effluent than would be achievable at the same amount of dissolved carbon dioxide as in the first stripper unit 15a. This results in a larger total amount of ammonia being removed from the liquid fraction in the second stripper unit 15b. Through the presence of a dedicated scrubber unit 16a, 16b for each one of the stripper units 15a, 15b, which scrubber units 16a, 16b are each provided with their own, independent acid inlet 18a, 18b, allowing the amount of acid let into a respective one of the scrubber units 16a, 16b being adjusted to achieve a specific favorable pH therein for cleaning the ammonium-containing gas such that the scrubbed air is clean air without using and excessive amount of acid.

The set of heat exchanger units forming the heat exchanger H for heating up the incoming effluent prior to processing, in addition to the one heat exchanger unit connected to the liquid discharge outlet I, may comprise a further heat exchanger unit connected to the process from which the effluent is resulting (not shown) and/or another heat exchanger unit connected to the scrubbed air outlet Ao, thereby recycling more residual heat from the process(es). All three residual heat flows, being the heat from the liquid discharge outlet I, heat from the process from which the effluent is resulting and heat from the air outlet, are fed to the incoming influent in order from lowest grade heat to highest grade heat.

Figure 2:
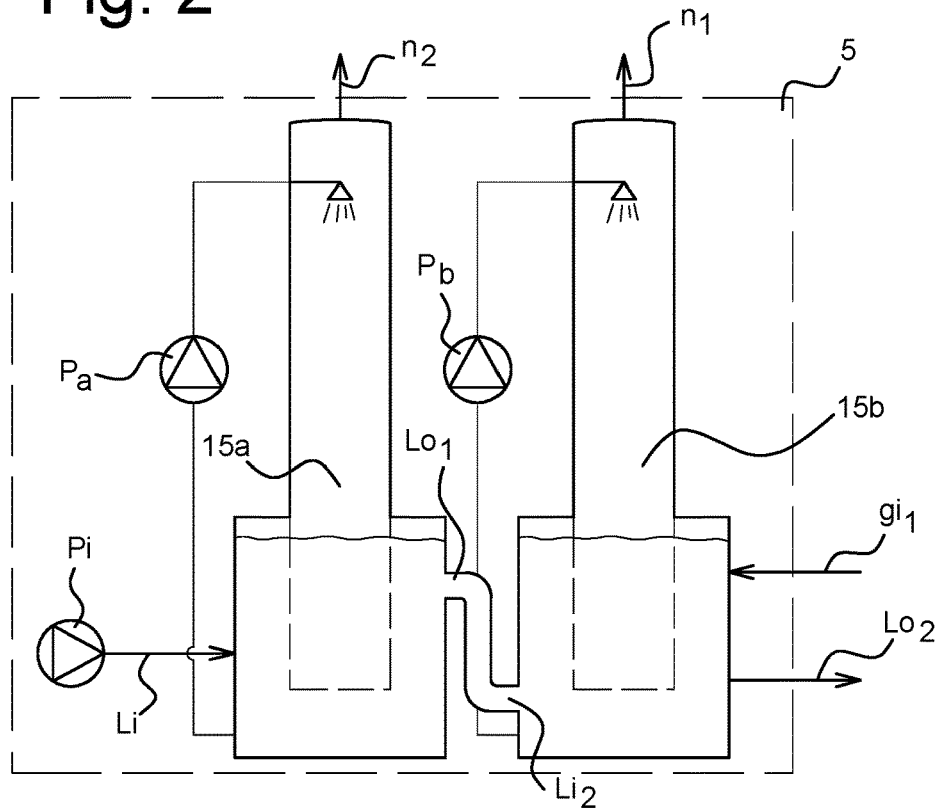
FIG. 2 shows a more detailed schematic representation of the air stripper of FIG. 1.

FIG. 2 shows a more detailed schematic representation of the air stripper of FIG. 1. Each of the two stripper units 15a, 15b are shown as being a stripper column in a sump. The liquid inlet Lit of the first stripper unit is provided with a pump P1, for pumping effluent into the sump of the first stripper unit 15a, which sump is in fluid communication with the sump of the second stripper unit 15b, by the liquid outlet Lot of the first stripper unit 15a being connected to the liquid inlet Li2 of the second stripper unit 15b. The gas inlet Gi1, letting air into the system via the air inlet Ao, is connected to the sump of the second stripper unit 15b, which sump is at the lower end of the stripper unit. The gas inlet Gi2 (not shown in FIG. 2) is similarly connected to the sump of the first stripper unit 15a. In order to optimise the contact between the ammonia-containing liquid and air within each one of the stripper units 15a, 15b, a column is provided in the sump, extending a predetermined height above the liquid in the sump, and comprising a respective pumping system Pa, Pb, adapted for pumping liquid from the sump up to a spray-head in the upper end of the stripper unit. Liquid sprayed by the spray-head towards the sump is contacted by air bubbling up through the liquid, increasing contact between the liquid and gas, and thereby optimising the generation of ammonia-containing gas. The pumping systems Pa,Pb of the stripper columns are independently operable from one another, allowing the circulation within a respective stripper unit 15a, 15b being adapted to the flow speed and concentrations of ammonia-containing liquid and air within the respective stripper unit in relation to the other stripper units within the system.

Depending on the amount of effluent and/or level of purification to be achieved by a particular cleaning facility, the system designed for that facility may contain more than the two stripper-scrubber units depicted in FIG. 1.

Figure 3:
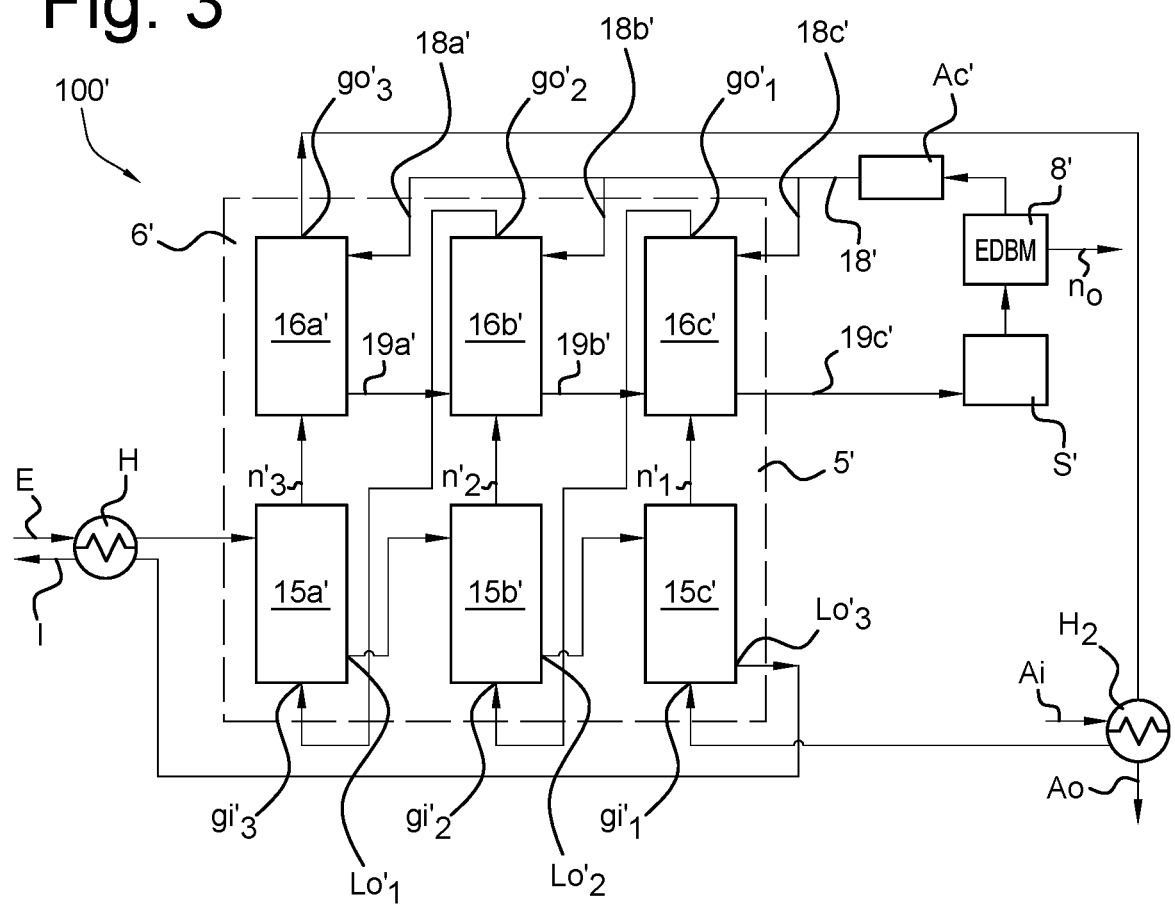
FIG. 3 shows another schematic of a system according to the present invention.

FIG. 3 shows another schematic of a system 100' according to the present invention. This system is similar to the system shown in FIG. 1, except that the stripper-scrubber set 6' has a stripper 5' of three stripper units 15a', 15b', 15c' and a scrubber of three scrubber units 16a', 16b', 16c', and that it comprises a second heat exchanger H2.

The three stripper units 15a', 15b', 15c' are each provided with a liquid inlet Li1', Li2', Li3' for receiving ammonia-containing liquid, and a liquid outlet Lo1' Lo2', Lo3' for discharging cleaned liquid, which is a fraction of the ammonia-containing liquid let into the respective stripper unit 15a', 15b', 15c'. Additionally, each stripper unit 15a', 15b', 15c' is provided with a gas inlet Gi1', Gi2', Gi3' for receiving air and a gas outlet N1', N2'. N3' for discharging ammonia-containing gas.

The three scrubber units 16a', 16b', 16c' are each provided with a gas inlet, for receiving ammonia-containing gas, and a gas outlet Go1', Go2', Go3' for discharging scrubbed air. Additionally, each scrubber unit 16a', 16b', 16c' is provided with an acid inlet 18a', 18b', 18c' and a salt removal outlet 19a', 19b', 19c'. As noted for the system of FIG. 1, the acid inlets 18b', 18'c, connected to subsequent scrubber units after the first scrubber unit 16a', are optional and independently operated. The gas inlets are provided in a lower end of each of the scrubber units 16a', 16b', 16c' and connected to a respective gas outlet N1', N2', N3' of one of the stripper units 15a', 15b', 15c' such that three stripper-scrubber columns 10 are formed.

The three stripper units 15a', 15b', 15c' and scrubber units 16a', 16b', 16c' are interconnected in similar fashion to the stripper and scrubber units in the embodiment in FIG. 1. The stripper units are in fluid connection with one another through a series connection via a liquid outlet and a liquid inlet of adjacent stripper units and the stripper and adjacent scrubber columns are interconnected via gas inlets and gas outlets, such that a gas flow through the system is counter-current to a liquid flow through the system. It will be obvious to the skilled person that within the spirit of the invention further stripper-scrubber columns may be added to a system and interconnected in the same fashion. The amount of stripper-scrubber columns 10 provided within the system depends on the nature of the effluent, the desired or required cleanliness of cleaned water coming from the system and the desired capacity. Any additional stripper-scrubber column in the system is similar to the central stripper-scrubber column depicted in FIG. 3. Thus an additional stripper unit in the series is with a liquid inlet connected to a preceding stripper unit and with a liquid outlet to a subsequent stripper unit, whilst being connected to a gas outlet of a subsequent scrubber unit. The scrubber unit directly connected to the gas outlet of the stripper unit is connected to the salt outlet of a preceding scrubber unit and has a salt outlet connected to a subsequent scrubber unit, whilst optionally being provided with an independent acid inlet.

The second heat exchanger H2 is provided at the scrubbed air outlet Ao of the system, for recovering heat prior to discharging the air to the ambient environment of the system 100'. The second heat exchanger H2 is connected to the air inlet Ai, for heating the air prior to entry in the last one of the stripper units 15c'. This is an alternative option for recycling of the residual heat at the scrubbed air outlet Ao. Instead, the second heat exchanger may be the other heat exchanger unit shown in FIG. 1, which is part of the first heat exchanger H for using the heat recovered from the air discharged from the system to heat up incoming ammonia-containing liquid.

FIG. 4 shows a schematic of a bipolar membrane electrodialysis element for use in a system such as depicted in FIG. 1 or FIG. 3. The basic aspect of electrodialysis with bipolar membranes (EDBM) is the combination of electrodialysis for salt separation with electrodialysis water splitting for the conversion of a salt into its corresponding acid and base. Hereto, the EDBM has an anode 81 and a cathode 82, positioned on opposite sides of the EDBM, with a plurality of membranes F1, F2 positioned therebetween, such that particles moving towards one of the anode and cathode 81, 82 pass through one or more of the membranes F1, F2. Hereto, the membranes F1, F2 are substantially parallel to the anode 81 and the cathode 82, defining a plurality of channels therebetween. The membranes F1, F2 are a special type of layered ion exchange membrane of which a first membrane F1 is only permeable for the anions and a second membrane F2 is only permeable for the cations. The membranes F1, F2 do not have a separation purpose, but effect a reaction in the bipolar junction of the membrane, which is where the first and second membranes F1, F2 are in direct contact. The EDBM is with an inlet, positioned at one end of the channels defined by the membranes F1, F2, connected to the salt buffertank S and with two outlets, positioned at a second end of the channels, to the acid buffertank Ac and the ammonia-outlet No. The bipolar membranes enhance the splitting of water into hydronium and hydroxide ions under a relatively low voltage, with transport of the ions through the membranes F1, F2 resulting in the original acid and ammoniumhydroxide. Due to the absence of electrode reaction, no oxidation-reduction reaction takes place, such that no byproduct will result from the process. Advantageously, the EDBM withstand continuous operations for an extended time since no regeneration process, like ion exchange resin process, is required. The EDBM depicted in FIG. 4 is a 2-chamber EDBM. It will be obvious to the skilled person that a 3-chamber EDBM can be used the same and with the same effect.

The present invention has been described above with reference to a number of exemplary embodiments as shown in the drawings. Modifications and alternative implementations of some parts or elements are possible, and are included in the scope of protection as defined in the appended claims.

The invention claimed is:

1. A system for removing ammonia from an ammonia-containing liquid, which system comprises:
a heat exchanger for heating the ammonia-containing liquid to a predetermined temperature;
an ammonia stripper for stripping ammonia from the ammonia-containing liquid from the heat exchanger and discharging the ammonia as ammonia-containing gas, the ammonia stripper comprising an ammonia-containing liquid inlet, an air inlet, an ammonia-containing gas outlet, and a liquid discharge outlet; and
an acid scrubber for reacting the ammonia in the ammonia-containing gas discharged from the ammonia stripper with acid to form an ammonium salt, the acid scrubber comprising an ammonia-containing gas inlet, an acid inlet, a salt removal outlet and a scrubbed air outlet;
wherein,
the ammonia stripper comprises at least two stripper units, which are in fluid communication with one another through a series connection, wherein, in each pair of adjacent stripper units, a liquid outlet of a first one of the pair of adjacent stripper units is connected to a liquid inlet of a second one of the pair of adjacent stripper units, and wherein a first of the at least two stripper units is with a liquid inlet connected to the ammonia-containing liquid inlet and a last of the at least two stripper units is with a liquid outlet connected to the liquid discharge outlet, forming a fluid flow path from the ammonia-containing liquid inlet through the at least two stripper units to the liquid discharge outlet; and
the acid scrubber comprising at least two scrubber units, which are in gas communication with one another and the at least two stripper units through a series connection, wherein, in each pair of adjacent scrubber units, an individual ammonia-containing gas inlet of each one of the adjacent scrubber units is connected to an individual ammonia-containing gas outlet of a respective ammonia stripper unit of a pair of adjacent stripper units, and a gas outlet of a second one of the adjacent scrubber units is connected to a gas inlet of the first one of the pair of adjacent stripper units, and wherein a gas inlet of the last of the at least two stripper units is connected to the air inlet and a gas outlet of the first of the at least two scrubber units is connected to the scrubber air outlet, forming a gas flow path from the air inlet through the at least two stripper units and scrubber units to the scrubber air outlet which is opposite to the fluid flow path through the striper units.

2. The system according to claim 1, wherein each scrubber unit comprises an individual acid inlet and an individual salt removal outlet.

3. The system according to claim 2, wherein the system further comprises a control system which is adapted to regulate an amount of acid into each one of the at least two scrubber units based on a concentration of ammonia in each respective one of the at least two scrubber units.

4. The system according to claim 1, wherein the system further comprises a bipolar membrane electrodialysis element, adapted for splitting ammonium salt into ammoniumhydroxide and acid, which bipolar membrane electrodialysis element comprises an inlet, which is connected to the salt removal outlet, an ammonium hydroxide outlet and an acid outlet, which is connected to the acid inlet of the acid scrubber, such that acid used in the acid scrubber for forming ammonium salt is recovered and recycled for use in the acid scrubber.

5. The system according to claim 1, wherein the liquid discharge outlet is connected to the heat exchanger, such that heat from the discharged liquid is recycled to heat up the ammonia-containing liquid prior to entering the ammonia stripper.

6. The system according to claim 1, comprising a further heat exchanger positioned at the air inlet of the ammonia stripper, to control the temperature of the scrubbed air entering the ammonia stripper.

7. The system according to claim 1, wherein each of the at least two stripper units comprises a column which is with an upper end connected to a respective one of the at least two scrubber units via the individual ammonia-containing gas outlet, and wherein each column is located in a sump.

8. The system according to claim 1, wherein one or more of the air inlet, ammonia gas outlet, ammonia gas outlet and scrubbed air outlet is provided with a fan.

9. A method of removing ammonia from an ammonia-containing liquid, the method comprising the steps of:
   heating the ammonia-containing liquid
   stripping ammonia from the ammonia-containing liquid in an ammonia stripper using air, and discharging the ammonia as ammonia-containing gas and the liquid as effluent; and
   passing the ammonia-containing gas into an acid scrubber and reacting the ammonia in the ammonia-containing gas with acid to form an ammonium salt, and discharging scrubbed air;
   wherein the step of stripping the ammonia from the ammonia-containing liquid comprises passing the ammonia-containing liquid through a series of at least two stripper units, and using fresh air only in a last one of the at least two stripper units, and wherein the step of passing the ammonia-containing gas into an acid scrubber comprises passing the ammonia-containing gas from each of the at least two stripper units to a respective one of at least two scrubber units, and using scrubbed air from the scrubber unit to strip ammonia from the ammonia-containing liquid in an ammonia stripper unit which is preceding to the ammonia stripper unit from which ammonia-containing gas is passed into the scrubber unit.

10. The method according to claim 9, further comprising the steps of:
    passing the ammonium salt through a bipolar membrane electrodialysis element which splits the ammonium salt into ammoniumhydroxide and acid; and
    recycling the acid to the acid scrubber for use in the scrubber units.

11. The method according to claim 9, further comprising the step of passing the effluent through a heat exchanger prior to discharge and using heat from the heat exchanger for heating the ammonia-containing liquid.

12. The method according to claim 9, further comprising the step of heating the fresh air used in the last one of the at least two stripper units prior to supplying the air to the last one of the at least two stripper units.

13. The method according to claim 12, further comprising passing scrubbed air discharged from the scrubber unit connected to the first one of the stripper units through a heat exchanger and using the heat for heating the fresh air used in the last one of the at least two stripper units.

14. The method according to claim 9, further comprising passing scrubbed air discharged from the scrubber unit connected to the first one of the stripper units through a heat exchanger and using the heat for heating the ammonia-containing liquid.

* * * * *